United States Patent
Merten et al.

[11] Patent Number: 5,913,403
[45] Date of Patent: Jun. 22, 1999

[54] DRIVE STATION FOR A SCRAPER-CHAIN CONVEYOR USABLE IN AN UNDERGROUND MINE WORKING

[75] Inventors: Gerhard Merten, Lunen; Ulrich Pletsch, Hattingen, both of Germany

[73] Assignee: DBT Deutsche Bergbau-Technik GmbH, Germany

[21] Appl. No.: 08/758,724

[22] Filed: Dec. 3, 1996

[30] Foreign Application Priority Data

Dec. 19, 1995 [DE] Germany .............................. 195 47 351

[51] Int. Cl.⁶ ...................................................... B65G 23/06
[52] U.S. Cl. ........................ 198/834; 198/560; 198/607; 198/733
[58] Field of Search ........................................ 198/834, 733, 198/607, 560; 192/69.91, 85 A

[56] References Cited

U.S. PATENT DOCUMENTS

| | | | |
|---|---|---|---|
| 2,965,217 | 12/1960 | Dommann et al. | 198/834 |
| 4,039,057 | 8/1977 | Monks | 192/85 R |
| 4,043,213 | 8/1977 | Gibson | 198/834 |
| 4,086,991 | 5/1978 | Swadley | 192/69.91 |
| 4,160,391 | 7/1979 | Monks | 198/834 |
| 4,482,039 | 11/1984 | Harris | 192/85 A |
| 4,673,079 | 6/1987 | Gründken et al. | 198/599 |

*Primary Examiner*—Janice L. Krizek
*Assistant Examiner*—Thuy V. Tran
*Attorney, Agent, or Firm*—Samuels, Gauthier & Stevens

[57] ABSTRACT

A drive and transfer station for an underground mining installation employs a frame with spaced apart walls over which material is transferred between scraper-chain conveyors one arranged along a long wall mineral face working and the other arranged along an access roadway. The scraper-chain assembly of the face conveyor is driven by drive assemblies on opposite sides of the frame which drive a rotatable chain drum.

At least one of the drive assemblies has a coupling in a gear box with a shaft which can be displaced axially with an adjusting device to drivably connect with the drum or to be released from the drum.

25 Claims, 4 Drawing Sheets

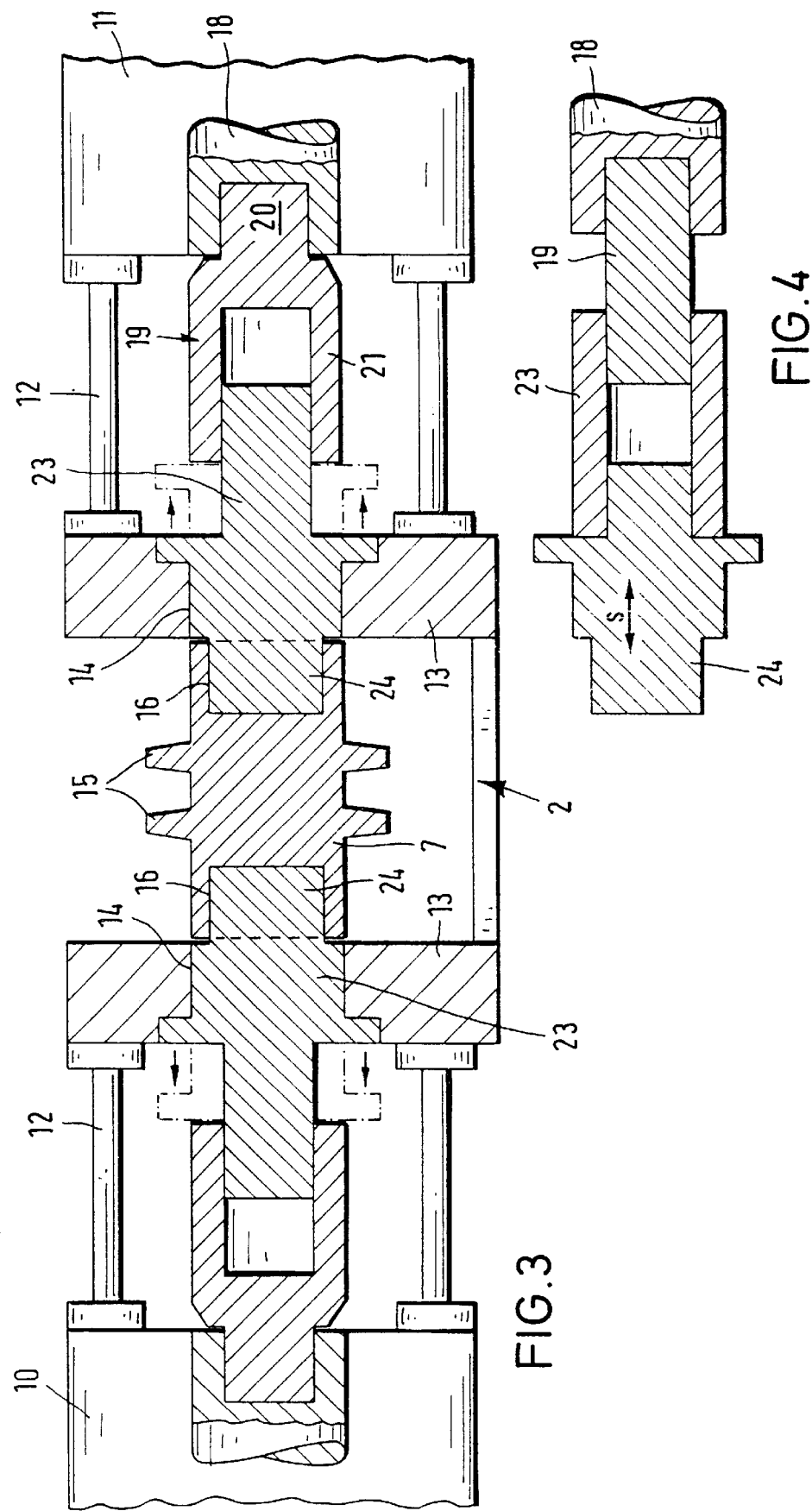

DRIVE STATION FOR A SCRAPER-CHAIN CONVEYOR USABLE IN AN UNDERGROUND MINE WORKING

FIELD OF THE INVENTION

The present invention relates to drive stations and to drive assemblies for use with scraper-chain conveyors employed in mineral mining.

BACKGROUND OF THE INVENTION

Scraper-chain conveyors are widespread in underground mining and are used mainly as face conveyors and transfer conveyors. The former type of conveyor is disposed along a mineral face to collect the mineral product detached with cutting machines while the latter is used to transfer the product along a roadway providing access to the longitudinal gallery with the mineral face. Because of the high power consumption of scraper-chain conveyors used in the mineral face operations it is usual to provide driving assemblies at both ends of the conveyor and forming a main drive and an auxiliary drive station for the face conveyor. In both cases double drives can be used with each station possessing two drive assemblies mounted on opposite side walls of a machine frame of the drive station. It is also known to connect the face conveyor to a transfer or haulage conveyor connected downstream in the conveying direction at right angles to the face conveyor with a transfer station in the form of a movable structural unit. In this case the two conveyors are connected by a so-called cross frame on which the transfer of product from the face conveyor to the haulage conveyor is performed. U.S. Pat. No. 4,673,079 shows such a transfer station. On the cross frame forming the transfer station the drive for the face conveyor is mounted as well as the generally driveless reversal for the haulage conveyor.

Known scraper-chain conveyors take a variety of forms but all are composed of a scraper-chain assembly circulated above and below the floor plates of a series of pans connected end-to-end. The scraper-chain assemblies can have a single chain or double chain inboard scraper-chain assembly or a double chain outboard assembly. Such conveyors can also serve to guide extraction machines, such as a coal plough or a roller or chain cutting machine.

It is generally desirable to have the extraction machine driven as close as possible to the end of the face conveyor in the region of the machine frame forming the drive or transfer station, in order to be able to extract mineral or coal over the entire length of the face. In this case the conveyor drive arranged on the drive station should not hinder the movement of the extraction machine. The driving assemblies for the face conveyor are as a rule mounted on the side walls of the machine frame forming the drive or transfer station. In order to ensure that a conveyor drive mounted on the workface-side of the machine frame does not hinder the movement of the extraction machine it is known to arrange the drive transmission and motor at a distance from the frame. Between one of the side walls of the frame and the drive a spacer comprising an intermediate box or the like is arranged which is securely connected to the side wall of the frame. UK patent specification 2030100 describes such structure.

In scraper-chain conveyors the scraper-chain assembly runs around a chain drum mounted in roller bearings in the frame of the drive station. The drum provided with one or more chain wheels, represents a component which is subject to high wear and therefore the drums have to be replaced from time to time during operation. This causes problems in the cramped underground workings and means that the drive assemblies of the conveyor drive have to be mostly detached and removed from the frame. In a driveless return of a scraper-chain conveyor it is known to mount the return drum in the frame so that it can be installed and removed as an assembly unit—see DE 42 04 381 A1—. In this case, the chain drum is supported between two axial pins arranged on the machine frame or its side walls and coupled detachably therewith by screws, so that the drum can be removed after loosening the screws towards the open end of the frame and on assembly can be installed into the frame from this end.

Furthermore, it is known to mount the chain drum on the driving station of the scraper-chain conveyor between the two side walls of the frame, so that it can be removed to its open end without the conveyor drive having to be detached from the machine frame and removed—see DE-AS 17 56 355—. In this arrangement the chain drum has axially projecting coupling flat pins at both ends with which it can be inserted from the end of the frame through insertion slots arranged in the side walls into the bearing openings in the side walls. The drive side coupling flat pin can be inserted into a corresponding end face coupling transverse groove in a drive shaft of the conveyor drive mounted on the exterior of the side wall and secured by means of detachable half rings secured on the inside of the side wall of the frame. This construction is comparatively complex and expensive. On the disassembly of the chain drum the screwed-on bearing rings have to be loosened and removed which in typical mining operations is an awkward and lengthy process. Furthermore, the bearing openings in the side walls of the frame must be provided with insertion slots which tend to weaken the frame.

An objective of the invention is to provide a drive station for a scraper-chain conveyor, in particular for use in underground mining operations, that is not excessively expensive, and which is designed so that the work of assembling and disassembling the chain drum can be made easier without relatively heavy components with screw connections having to be loosened and removed from the machine frame.

SUMMARY OF THE INVENTION

The present invention provides a drive station for a scraper-chain conveyor, said drive station comprising a frame with spaced-apart walls for resting on the floor of a mine working;

a chain drive mounted between the walls of the frame and around which a scraper-chain assembly of the conveyor is passed; bearings for rotatably supporting the chain drum; a drive assembly mounted on the exterior of one of the walls for driving the drum; and coupling means for drivably engaging the drive assembly to the drum. In accordance with the invention the coupling means includes a shaft which is in drivable engagement with the drive assembly, means for supporting the shaft for axially displacement and an adjusting device for displacing the shaft between positions where the shaft is in drivable connection with the drum and the shaft is drivably detached from the drum.

In a drive station according to the invention the releasable coupling of the chain drum can be established and performed at least on one side of the frame forming the drive side and preferably also on both sides thereof. The displaceable coupling shaft can form an intermediate shaft arranged axially displaceably in the drive connection between the drive transmission and chain drum and able to be uncoupled from its rotation-locked coupling with the chain drum. With a one-sided conveyor drive or a double drive with drive assemblies mounted on both sides of the frame the chain drum is mounted preferably on both sides by a coupling with an axially displaceable coupling shaft so that in the uncoupled position of the two coupling shafts the now free chain drum can either be removed from the free end of the frame or from the upper side thereof and on assembly can be reinserted accordingly in the installation space between the side walls of the frame, whereupon the coupling shafts are again brought into the coupling position with the chain drum. An arrangement is also possible in which the coupling with the adjustable coupling shaft is arranged only on one side of the frame whilst on the other side of the frame a second drive assembly is mounted directly on the side wall of the frame and is detachable e.g. by releasing screws. In this arrangement a transmission output shaft of the second assembly can be brought into drivable engagement with the chain drum or released without the adjustable coupling shaft. This construction can be adopted in particular when sufficient space is available for detaching and removing the second drive assembly from the frame which is generally the case when the drive assembly is on the offset side of the frame remote from the mineral face.

The chain drum used in the drive station of the invention has an axial length which corresponds approximately to the inside width of the frame between its side walls. The drum is preferably provided with an internally toothed inner bore in one or both ends for toothed engagement with the displaceable coupling shaft.

The coupling shaft, designed as a slidably displaceable shaft, can have a relatively short length. The movement of the shaft can be performed to advantage by means of a hydraulic adjusting device although adjusting devices of other types can be used e.g. a spindle drive, a magnetic adjusting device or also a hand-operated adjusting element, e.g. in the form of a pivot lever or slider or the like.

In a preferred embodiment of the invention, the arrangement is such that an axially toothed coupling shaft penetrates the bearing opening on the respective side wall of the machine frame and is displaceable both relative to the chain drum and to a transmission output shaft in an axial direction between the coupling position and the uncoupled position of the chain drum.

According to a further feature of the invention the chain drum bearings are assigned to a pair of displaceable coupling shafts so that the chain drum is mounted by the coupling shafts coupled therewith in the bearing openings of the side walls of the frame. The coupling shafts together with the assigned chain drum bearings guided displaceably in the bearing openings in the frame side walls are then axially displaceable between the coupled position and the uncoupled position so that the chain drum can be removed and installed without its bearings. Furthermore, it is recommended with a one-sided conveyor drive or double-sided conveyor drive to mount the transmission at the face side at a distance from the assigned side wall of the frame in an intermediate box which receives the displaceable coupling shaft preferably together with the adjusting device and which is preferably detachably mounted to the respective side wall e.g. by screws.

The drive station of the invention can to advantage, as is known, employ a cross frame to which a scraper-chain conveyor forming a face conveyor and a scraper-chain conveyor forming a haulage conveyor at right angles thereto are connected at their ends and which permits the transfer of product between the face conveyor and haulage conveyor. In this way at least the workface side drive assembly of the face conveyor drive on the cross frame is mounted by the intermediate box on the cross frame.

The invention may be understood more readily, and various other aspects and features of the invention may become apparent, from consideration of the following description.

BRIEF DESCRIPTION OF DRAWINGS

Embodiments of the invention will now be described, by way of examples only, with reference to the accompanying drawings, wherein:

FIG. 3 is a part-sectional schematic end view of the drive and transfer station shown in FIG. 1;

FIG. 4 is a schematic sectional representation showing an alternative shaft usable in the assemblies and the drive transfer station constructed in accordance with the invention and FIG. 5 is a part-section end view of part of a modified drive assembly in FIG. 1.

DESCRIPTION OF PREFERRED EMBODIMENTS

Figure 1:
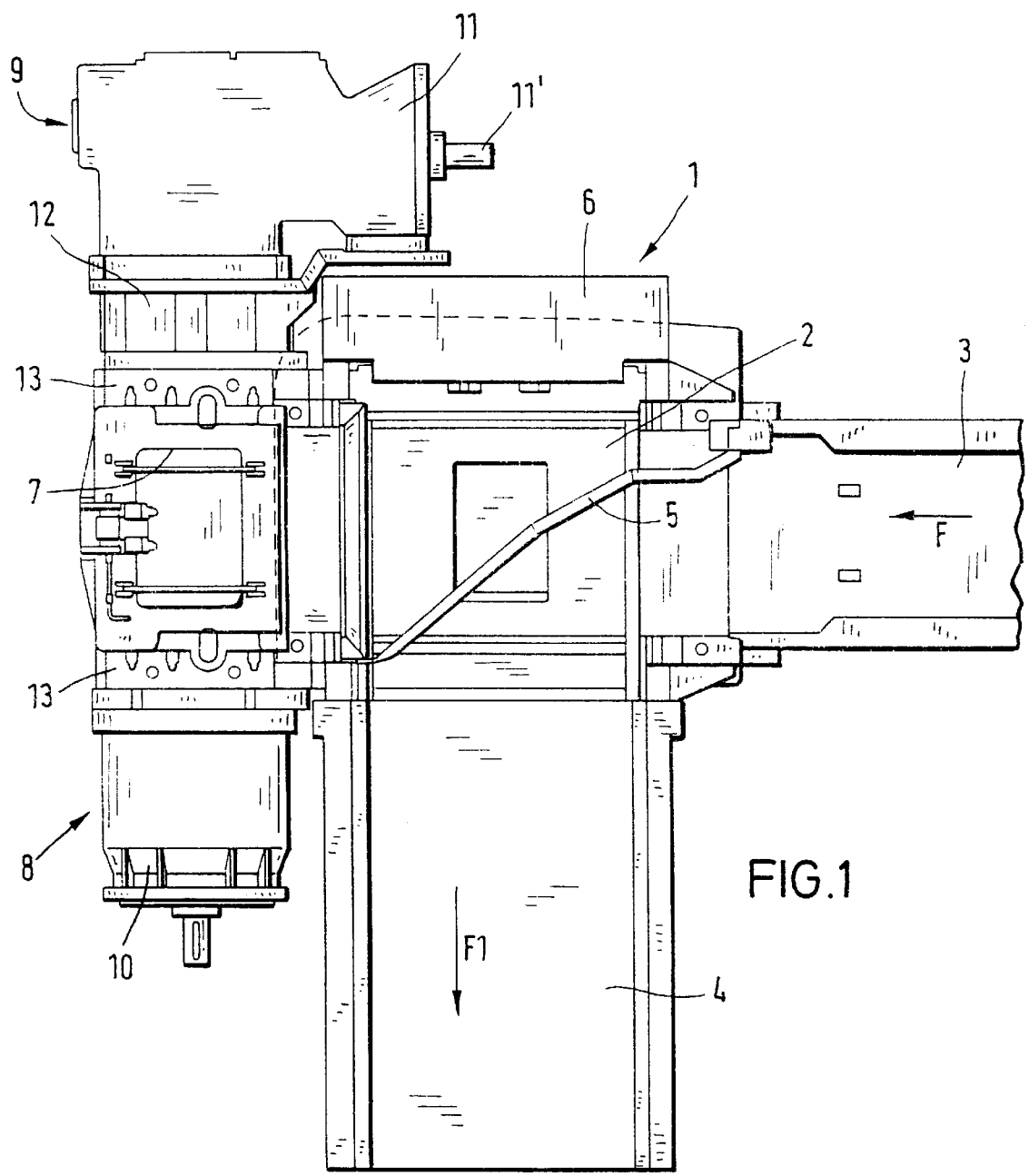
FIG. 1 is a plan view of a drive and transfer station and a drive assembly constructed in accordance with the invention.

As shown in FIG. 1, a combined drive and transfer station 1 for use in an underground mining installation employs a cross frame 2 which is mounted at the adjacent ends of a first scraper-chain conveyor 3 and a second scraper-chain conveyor 4. The conveyors 3,4 which are only partly represented in the drawing, are each composed of a series of elongate channel sections or pans mounted end-to-end and a scraper-chain assembly which is circulated in upper and lower runs above and below floor plates of the pans. The construction of these conveyors 3,4 is well known in the mining field. The scraper-chain assemblies of the conveyors 3,4 can take various forms. For example, the assemblies may have a single or double in-board chain disposed at the central region of the floor plates of the pans to which is mounted a series of spaced-apart scrapers extending over the width of the floor plates. Alternatively, the assemblies may have a pair of outboard chains adjacent the side walls of the pans to which the spaced-apart scrapers are attached. The first conveyor 3 would normally extend along a mineral face, e.g. a coal face and mineral product detached from the face by a machine, such as a plough or drum shearer, would be transferred along the conveyor 3 in the direction of arrow F by the scrapers of the scraper-chain assembly. The mineral product would then be transferred via the frame 2 onto the second conveyor 4 which extends predominately perpendicular to the face conveyor 3 and forms a roadway or gate haulage conveyor. The mineral is then transferred along the conveyor 4 in the direction of arrow F1 along an access roadway. Reference can be made to U.S. Pat. Nos. 4,673,079 and 5,186,309 which describe transfer stations of this type.

The frame 2 employs a deflector 5 which serves to divert larger pieces of the conveyed product over a floor plate of the frame 2 and then onto the conveyor 4. Smaller pieces of the conveyed product tend to fall through openings in a floor plate of the frame 2 directly onto the conveying floor of the conveyor 4 which extends therebeneath.

The scraper-chain assembly of the conveyor 4 is entrained around a chain drum mounted at a region of the frame 2 remote from the main section of the conveyor 4 and parallel to the mineral face. This drum is not driven so the drum is rotated solely by the passage of the scraper-chain assembly of the conveyor 4 which runs through the frame 2 beneath the deflector 5 and the floor plate thereof. The drum is disposed beneath a detachable cover 6.

The scraper-chain assembly of the conveyor 3 likewise runs through the frame 2 beneath the deflector 5 but above the floor plate and is entrained around a chain drum 7 at a region of the frame 2 remote from the main section of the conveyor 3. The chain drum 7 extends perpendicularly to the mineral face and is driven to propel the scraper-chain assembly of the conveyor 3. The drum 7 is driven with the aid of two separate drive assemblies 8,9 disposed at opposite ends of the drum 7. The drive assembly 8 is composed of a drive motor (not shown) coupled to the input shaft of a transmission in a gear box 10 generally aligned with the drum 7. The gear box 10 is mounted and fixed to a wall 13 of the frame 2 with the aid of detachable screws. The drive assembly 9 has a drive motor (not shown) coupled to an input shaft 11' of a transmission in a gear box 11 aligned parallel to the conveyor 3 which is fixed to an intermediate transverse gear box 12 mounted to a wall 13 of the frame 2 opposite the drive assembly 8. The gear boxes 11,12 of the drive assembly 9 thus transfer the drive through a right-angle. The gear box 12 is generally aligned with the cover 6 relative to the frame 2. The region of the frame 2 remote from the roadway or gate gallery in which the conveyor 4 is installed lies at the mineral face side of the working where conditions are more cramped. The disposition of the gearboxes 11,12 as close as possible to the frame 2 ensures minimal space is taken up by the drive assembly 9.

The drive assembly 8 does not have such restriction on space and the drive assembly 8 can be easily removed from the drive station by detaching the fixing screws. Preferably the frame 2 has one or more protective top covers extending at least partly over the locations of the drive assemblies 8,9.

Figure 2:
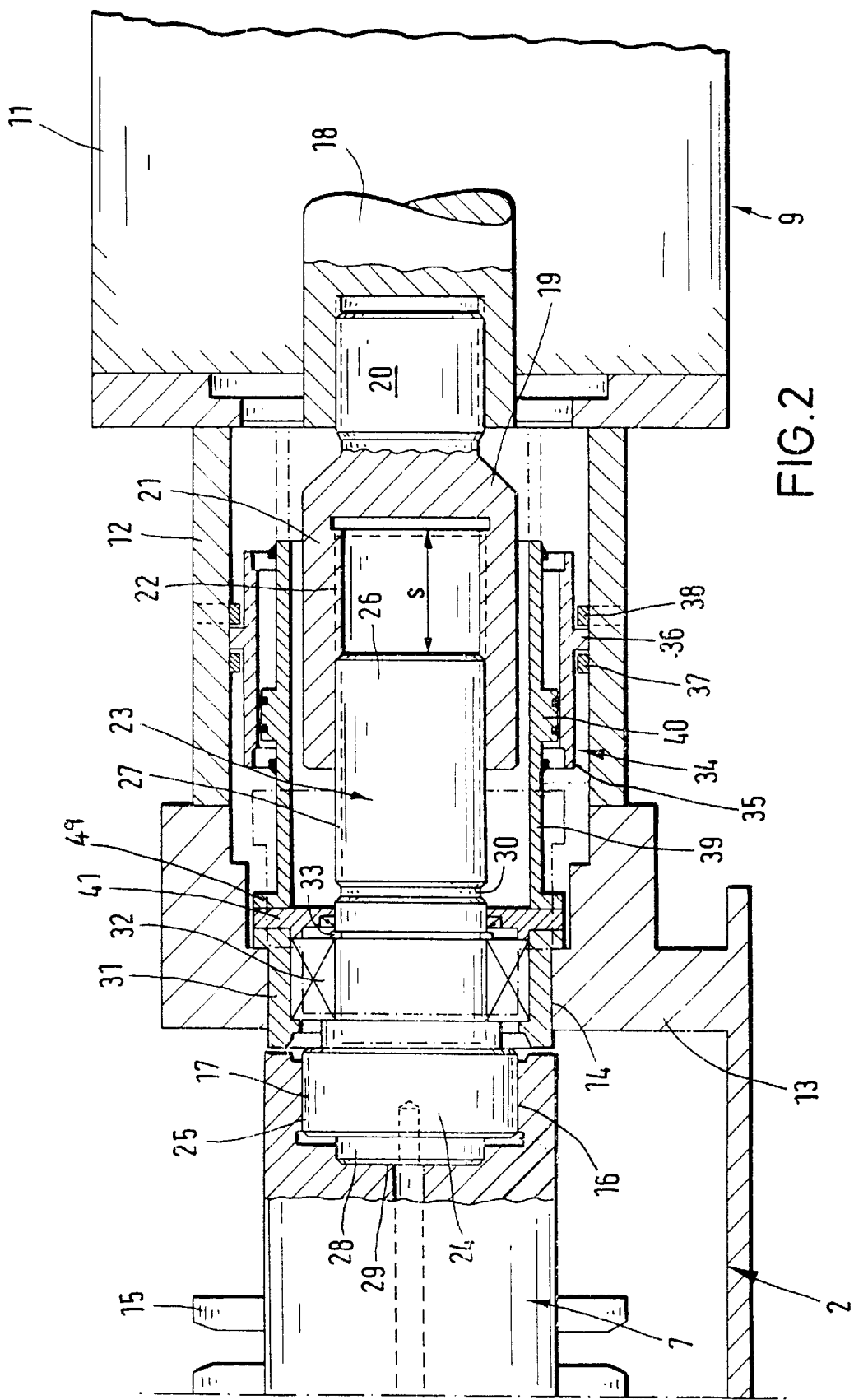
FIG. 2 is a more detailed part-sectional end view of part of the station and drive assembly shown in FIG. 1.

FIG. 2 depicts in more detail the construction of the intermediate gear box 12 and the drive connection with the drum 7. As shown in FIG. 2, the frame 2, only shown in part, has the vertical side walls 13 connected by a base plate which rests on the floor of the mine working. Each wall 13 is provided with an opening 14 in which bearings 32 for the rotational support of the chain drum 7 are mounted with the aid of support rings 31. The chain drum 7 has a cylindrical main body with a pair of toothed wheels 15 at its central region for engaging in the links of the chains of the scraper-chain assembly of the conveyor 3. The position of the toothed wheels 15 is here commensurate with a scraper-chain assembly of the double in-board chain type. The main cylindrical body of the drum has an axial length slightly smaller than the space between the inner faces of the side walls 13.

The drum 7, which is symmetrical about a central vertical plane, has inwardly extending openings 16 in the ends of the main body and these openings 16, which can take the form of blind bores, are provided around their peripheral surface with internal teeth 17, such has axial splines. The gear box 11 of the drive assembly 9 disposed near one of the ends of the drum 7 has an output shaft 18 extending axially of the drum 7 which is drivably coupled to the drum 7 which the aid of coupling means in the form of components 19,23. A first of these coupling components is in the form of an intermediate shaft 19 mounted in the gear box 12. The shaft 19 is drivably fitted to the shaft 18 with the aid of a reduced diameter toothed end portion 20 which engages into the shaft 18 and meshes with internal teeth set in a blind bore in the adjacent end of the shaft 18. The teeth of the shaft end portion 20 and the shaft 18 can take the form of axial splines. The end portion 20 merges with a larger dimension hollow head portion 21. The head portion 21 is also provided with internal teeth 22 such as axial splines which mesh with external teeth 27 such as axial splines provided on the exterior of an axial region 26 of a shaft 23 forming the second coupling component. The shaft 23 can be axially displaced within the hollow head portion 21 as indicated by arrow S while the teeth 22, 27 therebetween lock the shafts 19,23 for rotation together. The axial displacement of the shaft 23 permits the drive to the drum 7 to be disengaged for example, when it is desired to dismantle the assembly.

The shaft 23 has a series of axial regions some of which are of differing diameters. The shaft 23 extends through the opening 14 in the side wall 13 and has an axial region fixed to the rotatable inner ring of the bearing 32 which takes the form of a roller bearing. The shaft 23 has a larger diameter end region 24 which is provided with external teeth 25 such has axial splines which mesh with the internal teeth 17 in the opening 16 in the drum 7: The toothed end region 24 of the shaft 23 adjoins a reduced diameter spigot 28 which fits into a shallow recess 29 in the base of the opening 16 in the drum 7 to centre the shaft 23 relative to the axis of the drum 7. Between the two axial regions of the shaft 23 supported by the bearing 32 and provided with the teeth 27 there is a groove 30. The bearing 32 is retained on the shaft 23 by means of a securing ring 33 and a shoulder on the shaft 23. A support member 41 bears on the outer bearing support ring 31 and on the outer ring of the bearing 32. The arrangement is such that with the support member 41 set in the position shown in FIG. 2 the shaft 23 is drivably coupled between the drum 7 and the shaft 19 and there is a space between end face of the axial region of the shaft 23 provided with the teeth 27 and the base wall in the head portion 21 of the shaft 19. When it is desired to disengage the drive to the drum 7, the support member 41 is released to permit the shaft 23 to be axially displaced to the right of FIG. 2 towards the shaft 18 to bring the end region of the shaft 23 deeper inside the head portion 21 until the end region 24 of the shaft 23 is removed from the opening 16 in the drum 7. The bearing 32 is located axially opposite the ring 33 and the support member 41 by the shoulder on the exterior of the shaft 23 and a shoulder on the ring 31 so that as the shaft 23 is axially displaced to disengage from the drum 7 the bearing 31 and the ring 32 are likewise displaced.

The movement of the support member 41 necessary to allow the axial displacement of the shaft 23 is controlled with an adjustment device and in this embodiment with an hydraulic adjusting device 34. This device 34 takes the form of a cylindrical component 35 mounted in the gear box 12 and conveniently secured therein. The cylindrical component 35 is concentric with the shafts 18, 23, 19 and has an exterior flange 36 fitted between stops 37,38 on the inside of the gear box 12. The stop 38 is detachably mounted to permit the device 34 to be installed or dismantled. A tubular piston rod 39 with an integral piston 40 is guided with the piston 40 for slidable displacement axially of the cylindrical component 35. The end of the piston rod 39 remote from the shaft 18 has a flange 49 which bears on the support member 41. Conveniently the flange 49 of the piston rod 39 can be fastened to the support member 41 and to a flange of the support ring 31 with screws for example. Working chambers are provided in the cylindrical component 35 for receiving hydraulic pressure fluid which acts on the piston 40 from one side or the other. The charging of pressure fluid into one or other working chambers thus serves to displace the piston rod 39 in one extension direction where the support member 41 is held to maintain the drive connection with the drum 7 or the other retraction direction which allows the shaft 23 to be shifted towards the shaft 18 to disengage the drive to the drum 7. The retraction of the piston rod 39 can carry the support member 41 the bearing 32 and the support ring 31 along with shaft 23. If there is no connection between the flange 49 of the piston rod 39 and the support member 41 then the retraction of the piston rod 39 simply releases the bearing 32 with its support structure 31,33, 41 and the shaft 23 is displaced to the right by lateral shifting of the drum 7 or by use of a tool.

In a modified arrangement the support member 41 as such is combined with the flange 49 of the piston rod 39.

The chain dotted outline in FIG. 2 represents the shifted position of the shaft 23 the bearing 32 and the support structure 31,33, 41.

The drive assembly 8 on the other side of the frame 2 may be constructed in a similar fashion to that described in relation to the drive assembly 9. As a result the drum 7 can be disengaged from both drive assemblies 8,9 by shifting the shafts 23 and the drum 7 can be removed or replaced. FIG. 3 depicts in schematic representation a construction of this type where the gear box 10 of the drive assembly 8 is connected to the associated frame side wall 13 with another intermediate gear box 12 containing a coupling as described in connection with FIG. 2.

It is however possible to connect the drive assembly 8 to the drum 7 without the adjustable coupled described in connection with FIG. 2. In this case an output shaft of the drive assembly 8, can have external teeth such as axial splines which mesh with internal teeth such as axial splines in the opening 16 at the other end of the drum 7. The output shaft of the drive assembly 8 is then rotatably supported by the roller bearing 31 fitted into the opening 14 in the opposite frame side wall 13 adjacent the drive assembly 18. In order to allow the drum 7 to be released for removal or replacement in this alternative construction the entire drive assembly 8 is detached from the side wall 13 of the frame 2 by removing the attachment screws. This does present any great problem however since the assembly 8 is easily accessible in the region of the gate or roadway gallery along which the conveyor 4 extends.

In another construction for the drive and transfer station the drive assembly 8 is omitted so the drum 7 is only driven from one end in the manner of FIG. 2. The drum 7 is then supported in the side wall 13 of the frame 2 opposite the drive assembly 9 with the aid of a blind bearing. In this construction where the drum 7 is driven from only one end, the non-driven support for the drum 7 can still employ an axially displaceable shaft coupling operable similar to that described to permit the release of the drum from the blind bearing. However this is not essential since the shaft supporting the drum 7 can be removed and withdrawn by removing a housing attached to the side wall 13 with screws in a similar fashion to the drive assembly 8.

FIG. 4 depicts a modified form for the coupling component shafts 19, 23. In this construction the shaft 19 is a solid cylinder which has continuous splines on the exterior which mesh between the internal teeth or splines inside the shaft 18 as before as well as between internal teeth or splines in the shaft 23 which is now of tubular form. The end region 24 of the shaft 23 is now replaced by a separate stub shaft with the toothed end region 24 which drivably engages inside the opening 16 in the drum 7 with axial splines as before as well as another region engaged within the shaft 23. The adjustment of the modified coupling shown in FIG. 4 is analogous to that described in connection with FIG. 2.

Figure 5:
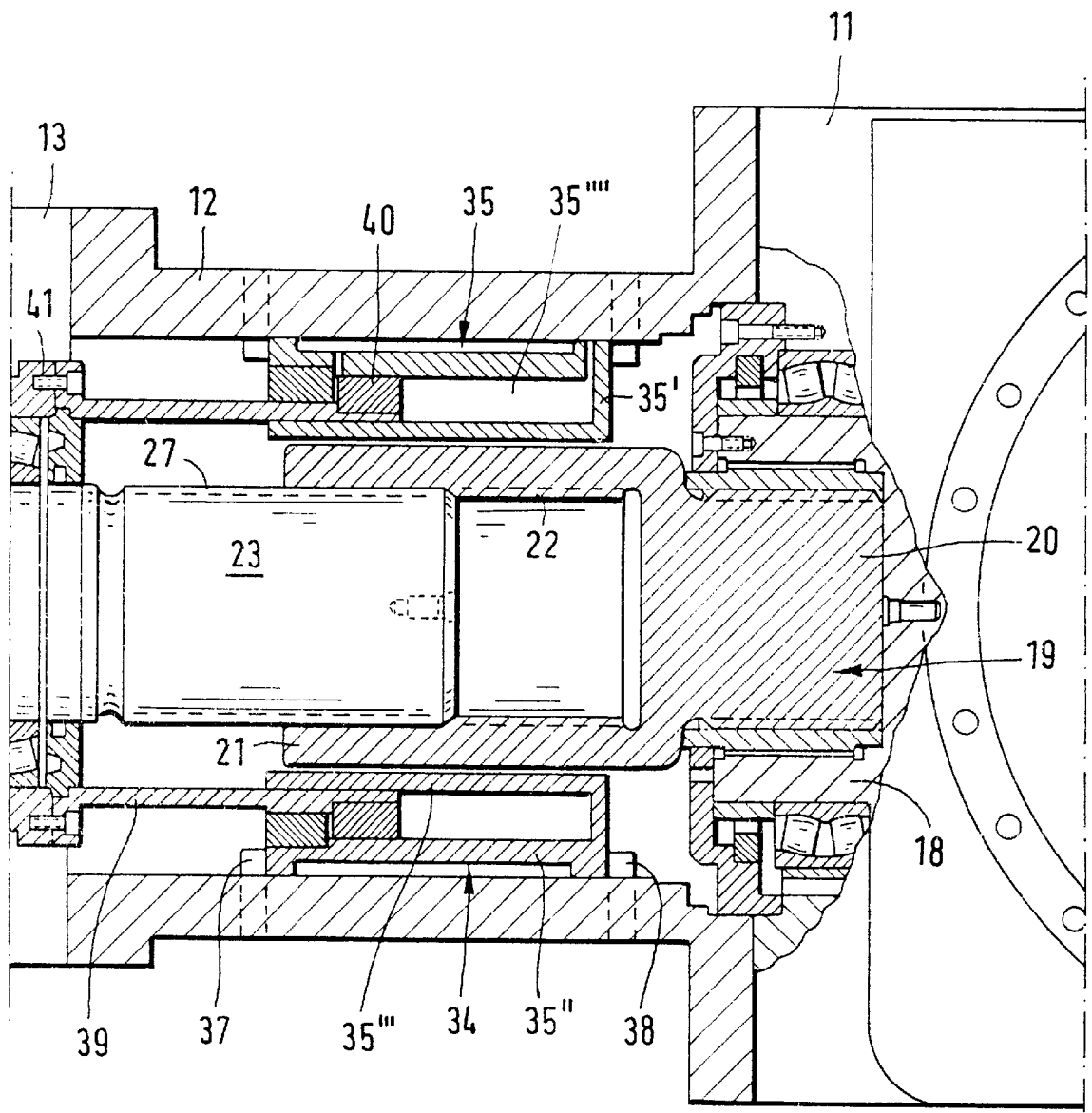

FIG. 5 shows a modified adjusting device 34. In FIG. 5 like reference numerals denote like parts to FIG. 2. In the modified device 34 the cylindrical component 35 has inner and outer walls 35", 35''' interconnected by a base wall 35' adjacent the gear box 11. The space between the walls 35", 35''' thus defines the working chambers (35"") for the annular piston 40 now fitted to one end of the tubular piston rod 39. The piston rod 39 is attached to the support member 41 with screws. The piston rod 39 in this modified design thus extends only from one side of the piston 40 and is thus shorter than the piston rod 39 in the FIG. 2 construction.

The cylindrical component 35 is again retained with the aid of stops 37,38 fitted inside the gear box 12 but the stops 37,38 now engage on the ends of the component 35. The stop 38, for example, is again detachable.

It will be apparent to one of ordinary skilled in the art that the above described embodiments are not intended to be limitive or exhaustive and other changes and modifications can be made without departing from the spirit and scope of the invention.

We claim:

1. In a drive station for a scraper-chain conveyor, said drive station comprising a frame with spaced-apart walls for resting on the floor of a mine working;

a chain drum mounted between the walls of the frame and around which a scraper-chain assembly of the conveyor is passed; bearings for rotatably supporting the chain drum and a drive assembly mounted on the exterior of one of the walls for driving the drum; the improvement comprising coupling means for drivably engaging the drive assembly with the drum, the coupling means including a shaft which is in drivable engagement with the drive assembly, means for supporting the shaft for axially displacement and an adjusting device for displacing the shaft between positions where the shaft is in drivable connection with the drum and the shaft is drivably detached from the drum, wherein the drive assembly has an output shaft in a gear box which is drivably coupled to the displaceable shaft and the displaceable shaft is mounted in an intermediate gear box disposed between the adjacent wall of the frame and the gear box with the output shaft.

2. A drive station according to claim 1, wherein drive assemblies are provided on the exteriors of both walls of the frame, one of said coupling means is provided between each drive assembly and the drum, each coupling means including said shaft, said means for supporting the shaft and said adjusting device, and the drum can be detached after operating the adjusting devices of both coupling means to release the drum from both drive assemblies.

3. A drive station according to claim 1, wherein the drum is supported on the wall of the frame opposite the drive assembly with another coupling means with an axially displaceable shaft which is displaced by another adjusting device of the other coupling means to become released from the drum and the drum can be detached after operating the adjusting devices of both coupling means to release the drum from both drive assemblies.

4. A drive station according to claim 1, wherein the adjusting device is an hydraulic device.

5. A drive station according to claim 1, wherein the chain drum has a cylindrical body disposed between the walls of the frame with its ends spaced from the side walls and the end of the body adjacent the drive assembly has an opening provided with teeth which receives an end region of the displaceable shaft which has teeth interengaging with the teeth in the opening in an axially displaceable but rotatably locked manner when the adjusting device is adjusted to establish the drivable connection between the drive assembly and the drum.

6. A drive station according to claim 5, wherein the shaft has another end region opposite to the drum which is provided with teeth and the teeth of the other end region interengage with teeth provided on a further shaft driven by the drive assembly in an axially displaceable but rotatably locked manner when the adjusting device has displaced the shaft to either position.

7. A drive station according to claim 5, wherein the end region of the displaceable shaft is of larger cross-section than the remainder of the shaft and the displaceable shaft has another axial region which engages in one of the bearings in the adjacent wall of the frame.

8. A drive station according to claim 5, wherein the opening in the drum body has a base wall provided with a recess and the displaceable shaft has a spigot which engages in the recess.

9. A drive station according to claim 1, and serving also as a transfer station to transfer material transported along the conveyor driven by the drive assembly onto a further scraper-chain conveyor extending perpendicularly thereto, wherein the further conveyor has a non-driven chain drum for its scraper-chain assembly which is mounted to the wall of the frame adjacent the drive assembly for the first mentioned conveyor.

10. A drive station according to claim 1, wherein the bearings for the drum are mounted in the openings in the walls and the bearing in the wall adjacent the drive assembly is displaced along with the shaft by the adjusting device.

11. A drive station according to claim 10, wherein at least the bearing in the wall of the frame adjacent the drive assembly is a roller bearing which is supported by a ring displaceably fitted in the opening in the frame wall.

12. A drive station according to claim 1, wherein the displaceable shaft is rotatably supported by one of the bearings.

13. A drive station according to claim 1, wherein the intermediate gear box is detachably affixed to the adjacent wall of the frame.

14. A drive station according to claim 1, wherein the output drive shaft has a bore which receives an end portion of an intermediate coupling shaft, the bore and the coupling shaft end portion have interengaging teeth to establish a driving connection between the output shaft and the intermediate shaft, the intermediate shaft supports the displaceable shaft, the intermediate shaft and the displaceable shaft have interengaging teeth to establish a driving connection between the intermediate shaft and the displaceable shaft and the intermediate shaft has means to accommodate the axial displacement of the displaceable shaft whilst maintaining the driving connection between the interengaging teeth of the intermediate shaft and the displaceable shaft.

15. A drive station according to claim 14, wherein the intermediate shaft has a hollow end portion with internal teeth and the displaceable shaft has a region engaging in the end portion and equipped with external teeth.

16. A drive station according to claim 14 wherein the intermediate shaft has exterior axial splines providing the teeth for interengaging both the teeth of the output shaft and the teeth of the displaceable shaft and the displaceable shaft is a two-part component one component taking the form of a tubular member with axial splines on its interior, the axial splines in the tubular member forming the teeth for drivably engaging with the teeth of the intermediate shaft as well as teeth for interengaging with teeth of the other component of the displaceable shaft which drivably engages with the drum.

17. A drive station according to claim 1, wherein the adjusting device is also mounted in the intermediate gear box.

18. A drive station according to claim 17, wherein the adjusting device is an hydraulic device which takes the form of a cylindrical component in which is mounted a piston and a tubular piston rod and the cylindrical component is mounted within the intermediate gear box to surround the displaceable shaft.

19. A drive station according to claim 18, wherein the piston rod serves to exert thrust force on one of the bearings which is mounted in the wall of a frame adjacent the drive assembly which rotatably supports the displaceable shaft to bring the shaft in the position wherein the drivable connection with the drum is established.

20. A drive station according to claim 19, wherein a support member is interposed between the bearing and the piston rod and the bearing is guided for displacement along with the displaceable shaft.

21. A drive station according to claim 18, wherein the cylindrical component is retained with the aid of stops in the intermediate gear box and at least one of the stops is detachable.

22. A drive station according to claim 18, wherein the cylindrical component is a double walled structure with the piston rod terminating at one end with the piston and the piston being disposed between the walls of the cylindrical component.

23. In a drive station for a scraper-chain conveyor, said drive station comprising a frame with spaced-apart walls for resting on the floor of a mine working;

a chain drum mounted between the walls of the frame and around which a scraper-chain assembly of the conveyor is passed; bearings for rotatably supporting the chain drum and a drive assembly mounted on the exterior of one of the walls for driving the drum; the improvement comprising coupling means for drivably engaging the drive assembly with the drum, the coupling means including a shaft which is in drivable engagement with the drive assembly, means for supporting the shaft for axially displacement and an adjusting device for displacing the shaft between positions where the shaft is in drivable connection with the drum and the shaft is drivably detached from the drum, wherein the chain drum has a cylindrical body disposed between the walls of the frame with its ends spaced from the side walls, the end of the body adjacent the drive assembly has an opening provided with teeth which receives an end region of the displaceable shaft which has teeth interengaging with the teeth in the opening in an axially displaceable but rotatably locked manner when the adjusting device is adjusted to establish the drivable connection between the drive assembly and the drum, the end region of the displaceable shaft is of larger cross-section than the remainder of the shaft and the displaceable shaft has another axial region which engages in one of the bearings in the adjacent wall of the frame.

24. In a drive station for a scraper-chain conveyor, said drive station comprising a frame with spaced-apart walls for resting on the floor of a mine working;

a chain drum mounted between the walls of the frame and around which a scraper-chain assembly of the conveyor is passed; bearings for rotatably supporting the chain drum and a drive assembly mounted on the exterior of one of the walls for driving the drum; the improvement comprising coupling means for drivably engaging the drive assembly with the drum, the coupling means including a shaft which is in drivable engagement with the drive assembly, means for supporting the shaft for axially displacement and an adjusting device for displacing the shaft between positions where the shaft is in drivable connection with the drum and the shaft is drivably detached from the drum, wherein the chain drum has a cylindrical body disposed between the walls of the frame with its ends spaced from the side walls, the end of the body adjacent the drive assembly has an opening provided with teeth which receives an end region of the displaceable shaft which has teeth interengaging with the teeth in the opening in an axially displaceable but rotatably locked manner when the adjusting device is adjusted to establish the drivable connection between the drive assembly and the drum, the opening in the drum body has a base wall provided with a recess and the displaceable shaft has a spigot which engages in the recess.

25. In a drive station for a scraper-chain conveyor, said drive station comprising a frame with spaced-apart walls for resting on the floor of a mine working;

a chain drum mounted between the walls of the frame and around which a scraper-chain assembly of the conveyor is passed; bearings for rotatably supporting the chain drum and a drive assembly mounted on the exterior of one of the walls for driving the drum; the improvement comprising coupling means for drivably engaging the drive assembly with the drum, the coupling means including a shaft which is in drivable engagement with the drive assembly, means for supporting the shaft for axially displacement and an adjusting device for displacing the shaft between positions where the shaft is in drivable connection with the drum and the shaft is drivably detached from the drum, wherein the bearings for the drum are mounted in the openings in the walls, the bearing in the wall adjacent the drive assembly is displaced along with the shaft by the adjusting device, and at least the bearing in the wall of the frame adjacent the drive assembly is a roller bearing which is supported by a ring displaceably fitted in the opening in the frame wall.

\* \* \* \* \*